United States Patent
Cole et al.

(10) Patent No.: US 7,451,232 B1
(45) Date of Patent: Nov. 11, 2008

(54) METHOD FOR REQUEST AND RESPONSE DIRECT DATA TRANSFER AND MANAGEMENT OF CONTENT MANIFESTS

(75) Inventors: Colin S. Cole, Glenview, IL (US);
Angela Mills, Redmond, WA (US);
Daniel J. Rogers, Bellevue, WA (US);
Marcelo R. Uemura, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 09/605,544

(22) Filed: Jun. 29, 2000

Related U.S. Application Data

(60) Provisional application No. 60/207,086, filed on May 25, 2000.

(51) Int. Cl.
*G06F 15/16* (2006.01)
*G06F 17/21* (2006.01)
(52) U.S. Cl. .................................. 709/245; 715/234
(58) Field of Classification Search ............... 709/245, 709/246, 230, 231, 200, 201, 203; 707/10; 715/234
See application file for complete search history.

(56) References Cited

U.S. PATENT DOCUMENTS

| | | | | |
|---|---|---|---|---|
| 6,012,098 A * | 1/2000 | Bayeh et al. | ................ | 709/246 |
| 6,122,372 A * | 9/2000 | Hughes | ......................... | 380/2 |
| 6,151,602 A * | 11/2000 | Hejlsberg et al. | ............. | 707/10 |
| 6,167,448 A * | 12/2000 | Hemphill et al. | ............ | 709/224 |
| 6,279,043 B1 * | 8/2001 | Hayward et al. | ............ | 719/328 |
| 6,331,858 B2 * | 12/2001 | Fisher | ........................ | 345/582 |
| 6,339,795 B1 * | 1/2002 | Narurkar et al. | ............ | 709/246 |
| 6,363,249 B1 * | 3/2002 | Nordeman et al. | .......... | 455/418 |
| 6,421,706 B1 * | 7/2002 | McNeill et al. | ............. | 709/204 |
| 6,434,568 B1 * | 8/2002 | Bowman-Amuah | ..... | 707/103 R |
| 6,446,110 B1 * | 9/2002 | Lection et al. | .............. | 709/203 |
| 6,477,565 B1 * | 11/2002 | Daswani et al. | ............. | 709/217 |
| 6,507,856 B1 * | 1/2003 | Chen et al. | .................. | 715/513 |
| 6,523,172 B1 * | 2/2003 | Martinez-Guerra et al. | . | 717/143 |
| 6,560,607 B1 * | 5/2003 | Lassesen | .................... | 707/101 |
| 6,615,212 B1 * | 9/2003 | Dutta et al. | ................... | 707/10 |
| 2005/0008003 A1 * | 1/2005 | Ramey et al. | ............... | 370/352 |

\* cited by examiner

*Primary Examiner*—Glenton B Burgess
*Assistant Examiner*—Aaron Strange
(74) *Attorney, Agent, or Firm*—Birch, Stewart, Kolasch & Birch, LLP

(57) ABSTRACT

A method for automatically exchanging computer data is disclosed. The method includes the step of first generating a data file with a markup language in accordance with a predetermined schema. The schema is agreed upon by the source and destination location. Next, a software envelope containing the data file is generated. The software envelope is transmitted to the destination location. At the destination location, an object is created from the data file with a plugin object corresponding to the predetermined schema.

20 Claims, 6 Drawing Sheets

FIG. 1 - Prior Art

\<envelope type   namespace\> ← 302

\<header\> ←304      303

\<delivery\>...\</delivery\> ←306

\<manifest\>...\</manifest\>←308

\</header\>←304

\<body\>The data is contained here \</body\> ←310

\</envelope type\> ←302

FIG. 3

```
<body>           ← 310                                      ← 603
    <part_order_3  xmlns="http://partorderschema.xml">  ← 602
        <orderHeader>                          ← 604
            <poNumber>A123C</poNumber>
            <custID>xyz</custID>
            <description>Order for 10 widgets</description>
            <sendto>123, Main Street, Washington, DC, 200001</sendto>
            <Contact>
                <contactName>John Doe</contactName>
                <contactPhone>3015557318</contactPhone>
            </Contact>
        </orderHeader>
        <order>
            <partNo>3614</partNo>
            <quantity>10</quantity>
            <deliver>April 28, 2001<deliver>
        </order>
    </part_order_3>  ← 602
<body>    ← 310
```

FIG. 6

METHOD FOR REQUEST AND RESPONSE DIRECT DATA TRANSFER AND MANAGEMENT OF CONTENT MANIFESTS

This application claims the benefit of U.S. Provisional Application No. 60/207,086 filed on May 25, 2000, the entire disclosure of which is hereby incorporated by reference.

BACKGROUND OF THE INVENTION

1. Technical Field

The present invention relates to the field of the automated exchange of computerized data. More particularly, the invention provides methods and systems that allow for the automated exchange of information between application programs running on different operating systems.

2. Related Information

Businesses and individuals have become increasing reliant upon the automated exchange of data between computers, computer programs and software applications. Businesses and individuals automatically interact between their own internal line of business, productivity and knowledge management applications, the applications used by their customers and partners, and services provided by their commercial and corporate providers. The use of a variety of different operating systems and software applications by those wishing to automatically exchange data has made the exchange process difficult and expensive.

Conventionally, programmers at two businesses wishing to automatically exchange data would have to agree on how the information would be exchanged. For example, when company A decides to order 10 parts having a part number 3614 for delivery on Apr. 28, 2001, company A would send company B a data stream similar to 10,3614, Apr. 28, 2001. The programmers at each company would have to modify application programs at the two locations to include computer code for the formation, transport and protocol used for the exchange of such information. Furthermore, each field would have to be a predetermined length and transmitted in the correct order.

What is needed is an approach that allows four the efficient automated exchange of data between application programs operating on different operating system platforms.

SUMMARY OF THE INVENTION

The present invention provides a framework that allows for the efficient exchange of data between application programs even when the application programs are operating on different operating system platforms.

The present invention provides a method for exchanging data between a source location and a destination location. The method includes the initial step of generating a data file with a markup language in accordance with a predetermined schema. A software envelope containing the data file is then generated and transmitted to the destination location. At the destination location, an object is created from the data file with a plugin object corresponding to the predetermined schema.

A second envelope may automatically be generated from the information contained in the first software envelope. The second envelope may have a destination address matching the source address of the first envelope. Alternatively, the second envelope may have a destination address determined by state information contained in the first envelope.

The software envelope may be transmitted via electronic mail, HTTP or an intermediate server.

The advantages of the present invention may also be provided by a computer-readable medium having stored thereon a particular data structure. The data structure includes: (a) a first field containing address information; (b) a second data field containing the identification of a predetermined schema; and (c) a third data field containing a data file formatted in a markup language in accordance with the schema.

Other features and advantages of the invention will become apparent with reference to the following detailed description and the figures.

BRIEF DESCRIPTION OF THE DRAWINGS

The present invention is illustrated by way of example and not limitation in the accompanying figures in which like reference numerals indicate similar elements and in which:

FIG. 3 is a listing of tags that contain envelope and data information;

FIG. 6 illustrates a part order schema.

DETAILED DESCRIPTION OF THE INVENTION

Although not required, the invention will be described in the general context of computer-executable instructions, such as program modules, that are executed by a personal computer or a server. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
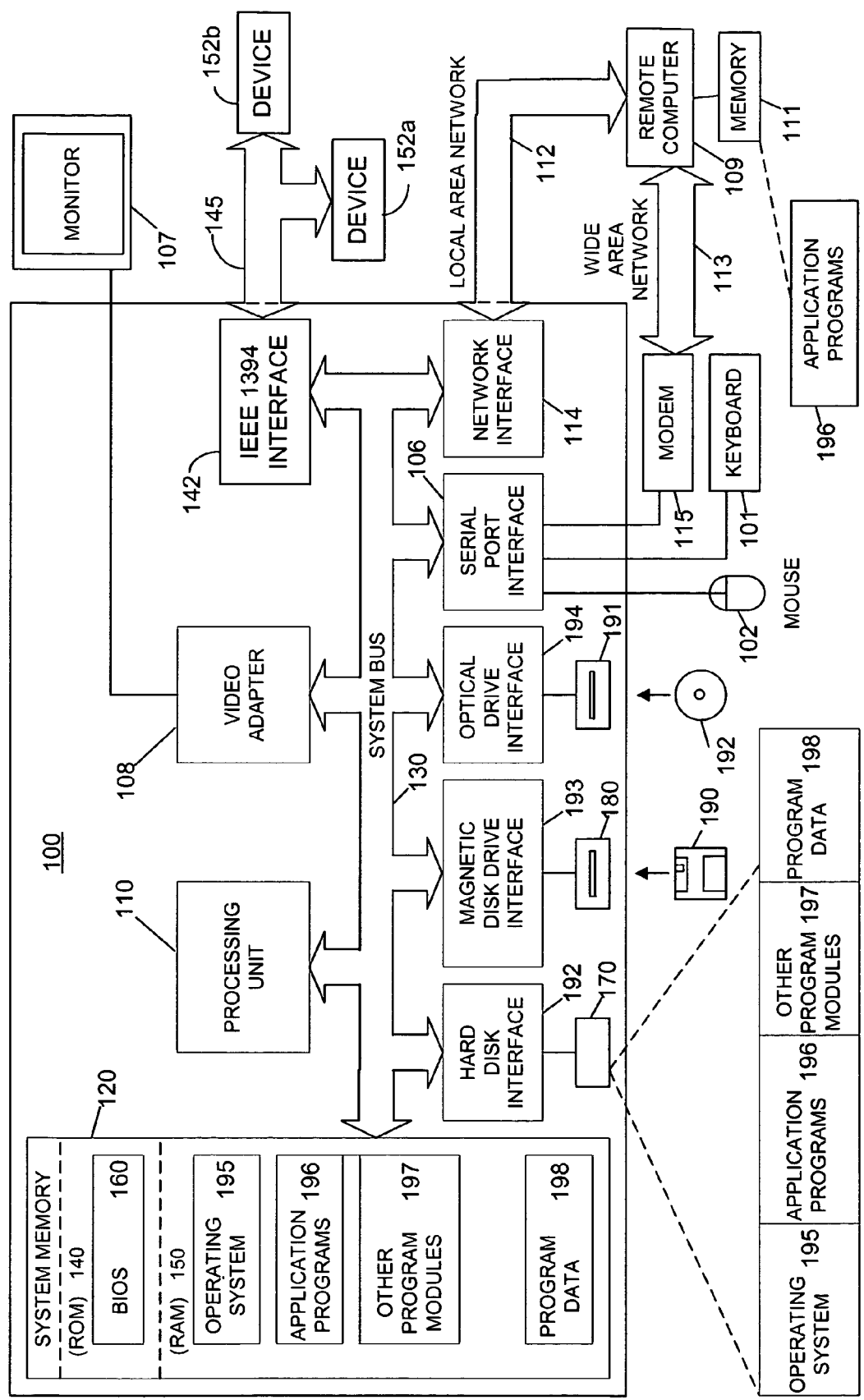
FIG. 1 is a schematic diagram of a conventional general-purpose digital computing environment that can be used to implement various aspects of the invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port, a universal serial bus (USB) or through a PCI board. A monitor 107 or other type of display device is also connected to system bus 130 via an interface, such as a video adapter 108. In addition to the monitor, personal computers typically include other peripheral output devices (not shown), such as speakers and printers. An IEEE 1394 interface 142 also connects a bus 145 to system bus 130. Bus 145 allows for the interconnecting of devices 152a and 152b.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other ways of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

Figure 2:
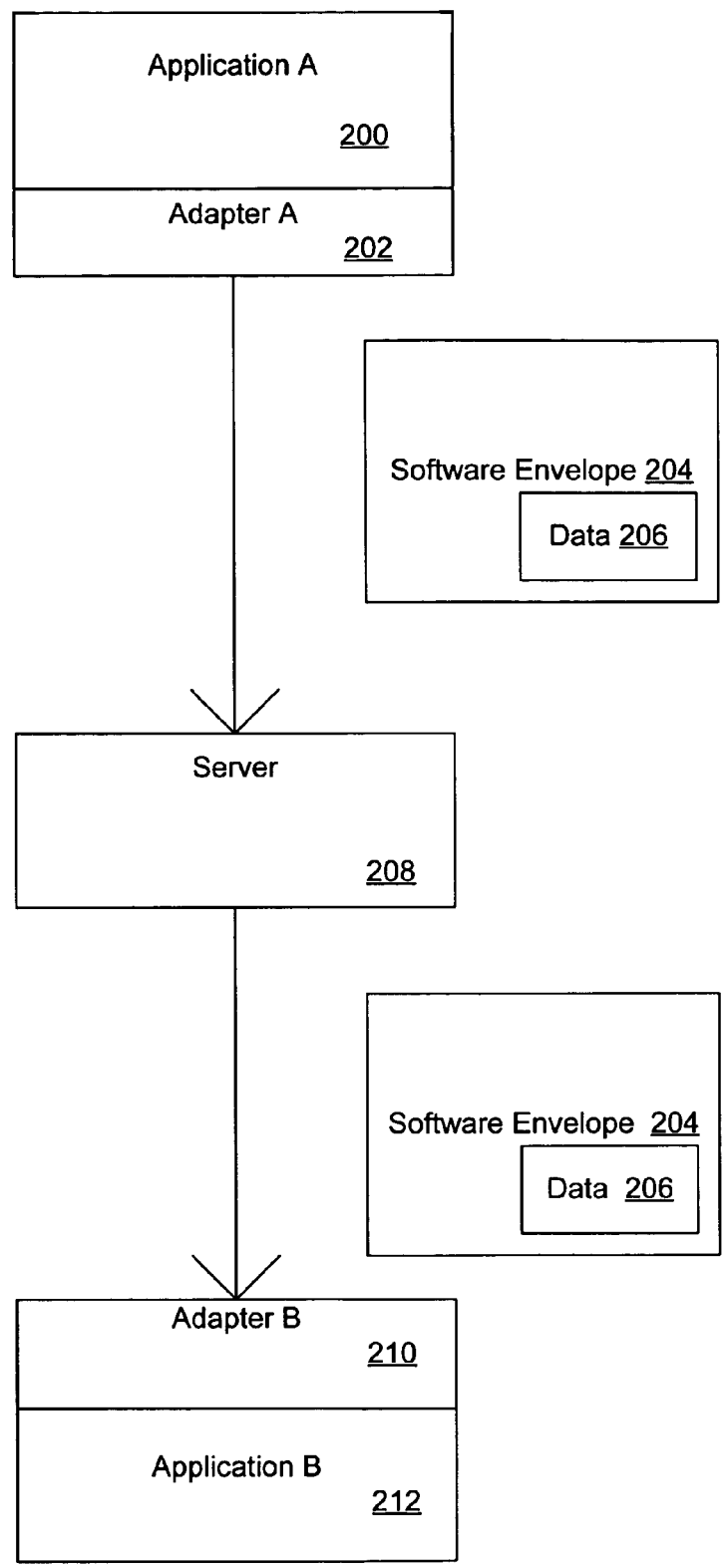
FIG. 2 is a block diagram of a configuration used to exchange data.

FIG. 2 is a functional block diagram of elements that may be used in accordance with the present invention to exchange data from a source location to a destination location. Application 200 may be a computer program located at the source location. An adapter 202 may be an application that creates a software envelope 204 that contains data 206. In this patent the term "envelope" refers to information that defines a delivery convention such as one or more of routing information, return routing information and state management information, much in the same way that a postal system envelope defines a convention where routing and delivery can be accomplished independent of the final purpose, processing, disposition, and information of the contents of the envelope. Of course, this list is not intended to limit or define the exact information of any particular envelope, but simply illustrate the types of information that may be included in an envelope. In an alternative embodiment, application 200 may contain computer code for performing the function of adapter 202. An example of software envelope 204 is described in detail below. A server 208 may handle and route software envelope 204 to the destination location. A single server is shown for illustration purposes only and with the understanding that two or more servers may be connected between the source and destination points as is conventionally done in computer networks such as the Internet. Furthermore, software envelope 204 may be transmitted between application 200 and application 212 via any number of data transmission mechanisms including electronic mail and HTTP. An adapter 210 extracts data 206 from software envelope 204 for further processing by an application 212.

The present invention may use a markup language, such as the extensible markup language (XML) or the standard generalized markup language (SGML) to create and transmit envelopes and data. FIG. 3 shows XML tags that may be used to form an envelope that contains data. The <envelope type> tags 302 may be used to identify the type of envelope and an associated namespace 303 so that the envelope can be processed by the server. Namespace 303 may identify element declarations. When using the BizTalk Framework and BizTalk servers, opening tag 302 may be replaced with <biztalk_1 xmlns="urn:biztalk-org:biztalk:biztalk_1">. The information contained within the <header> tags 304 may contain delivery and message content information. Delivery information may be contained within <delivery> tags 306 and message content information may be contained within <manifest> tags 308. Furthermore, data 206 (shown in FIG. 2) may be contained within <body> tags 310.

Figure 4:
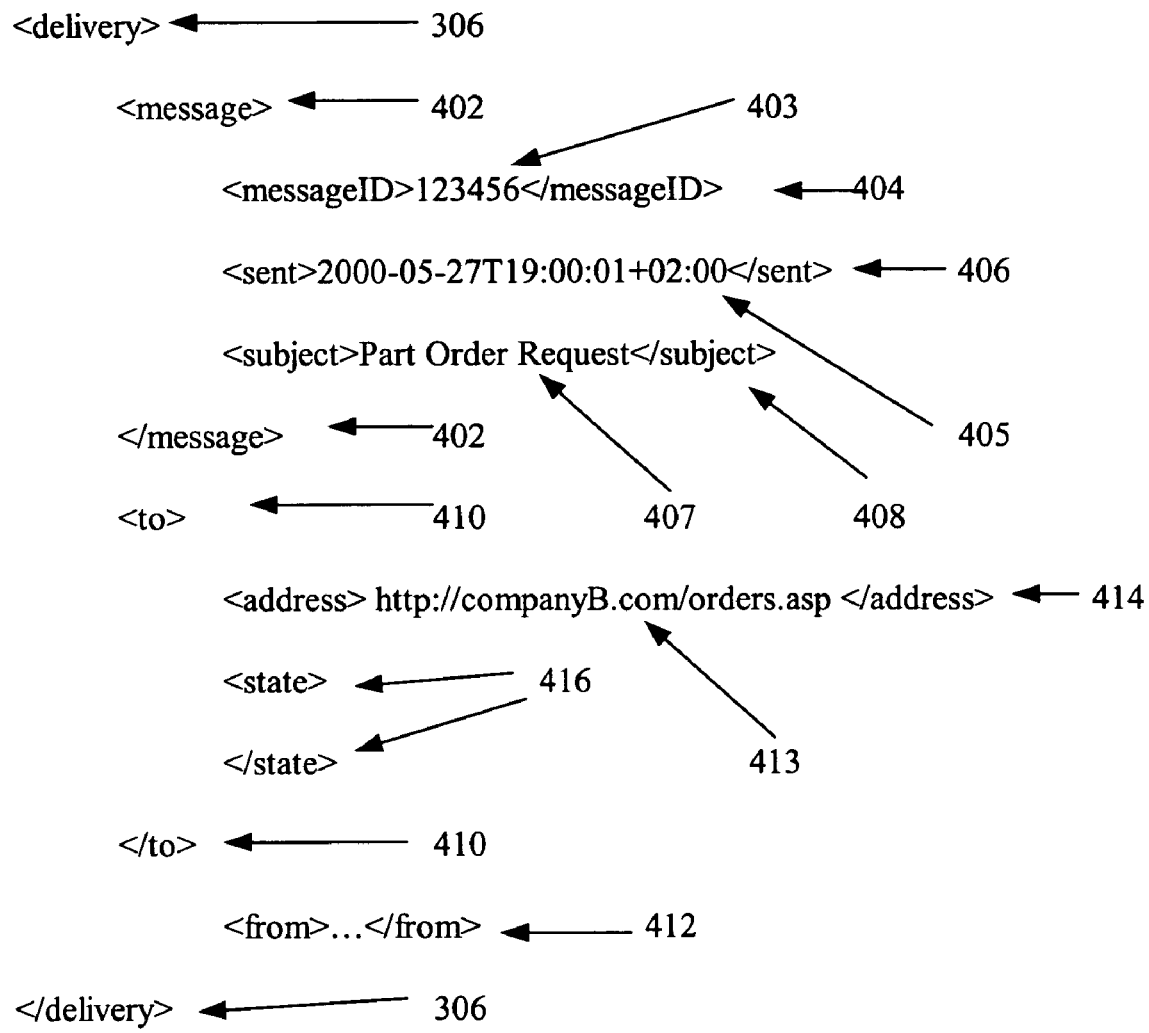
FIG. 4 is a listing of tags that contain delivery information.

FIG. 4 shows the type of information that may be included within <delivery> tags 306. The information between <message> tags 402 may contain unique information specific to the particular data being exchanged. For example, an envelope identification code 403 may be contained within <messageID> tags 404. Envelope identification code 403 may be used for logging, tracking, error handling, or other message processing/reprocessing requirements. Application 200 or adapter 202 (shown in FIG. 2) may generate a unique envelope identification code for each envelope. The <sent> tags 406 may contain a time stamp 405 indicating when the envelope was transmitted from an application. Time stamp 405 may use the ISO 8601 format.

Text 407 describing the contents of the envelope may be contained within <subject> tags 408. For example, FIG. 4 includes text 407 indicating that the envelope contains data for ordering parts.

The destination location for the envelope may be contained within the <to > tags 410. The information contained within <from> 412 pertains to the source location and may be similar to the information contained within <to> tags 410 and described below. A Universal Resource Identifier (URI) describing the logical address of a destination location may be included within <address> tags 414. The logical address of a source or destination location may be independent of the transport mechanism used to transport the envelope. However, if Application 200 or adapter 202 (shown in FIG. 2) is already configured with a transport specific URL 413 for the destination system, it can be specified in place of the URI. In one embodiment of the invention, server 208 (shown in FIG. 2) may be used to resolve a destination location URI into the appropriate transport-specific address when provided with a logical identifier of the destination location.

State information may be contained within <state> tags 416. State information may be used to correlate individual messages with specific exchanges and processes and may include interchange, handle, and state identifiers. For example, state information may instruct the recipient of an envelope to send replies to an address that is different from the source location.

The present invention allows the recipient of an envelope containing data to conveniently reply to the sender. In particular, the information making up the envelope can be used to automatically create a new reply envelope. In one embodiment of the invention, application 212 or adapter 210 (shown in FIG. 2) creates a new envelope with the source and destination address information reversed. Furthermore, state information may be used to indicate that a response should be sent to an address other than the source address. For example, state information attached to a purchase order may indicate that an order acknowledgement reply should be sent to a second address while a shipping notice reply should be sent to a third address.

Figure 5:
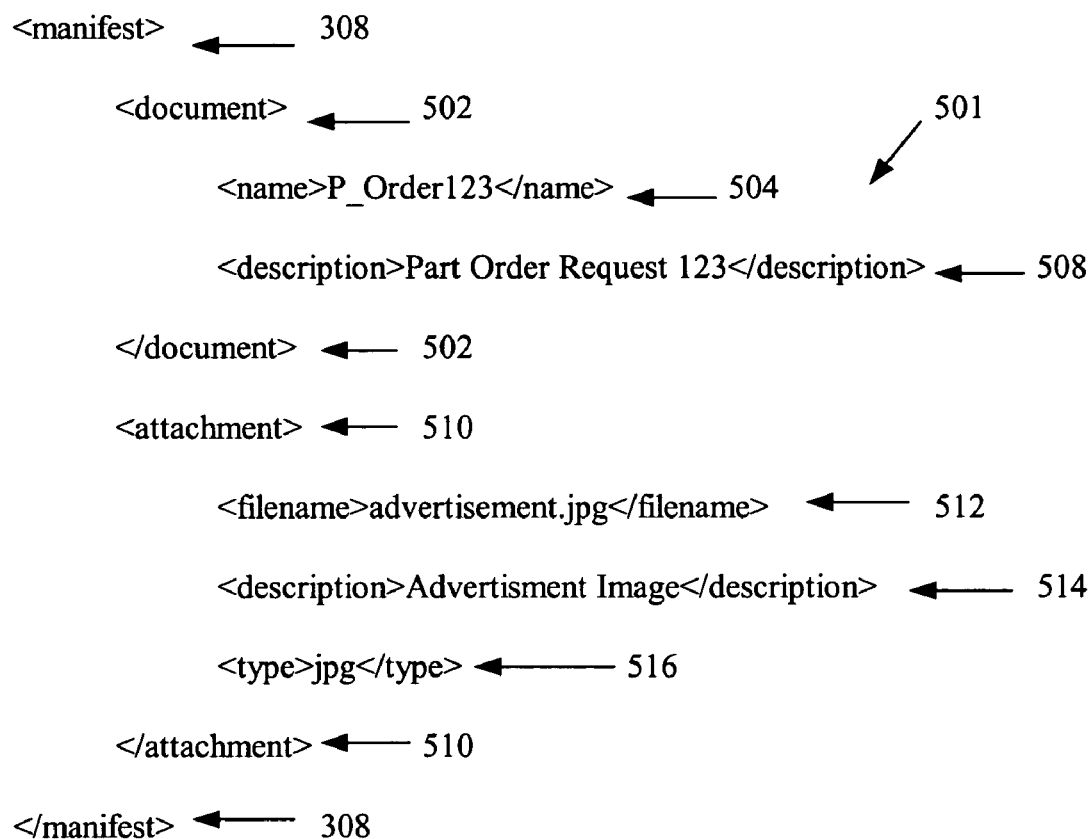
FIG. 5 is a listing of tags that contain manifest information.

FIG. 5 shows the type of information that may be contained within the <manifest> tags 308. Such information may indicate the type of information contained in the software envelope. The identification of each data file 206, shown in FIG. 2 and described in detail below, is found between a pair of <document> tags 502. FIG. 5 shows a single document 501 for illustration purposes only. When two or more documents are sent in the same envelope, they may be listed between the <manifest> tags 308 in the same order that they appear between <body> tags 310 to facilitate the processing of the information. The name of the data file corresponding to element 206, shown in FIG. 2, may be contained within <name> tags 504. A textual description of the data file may be contained within <description> tags 508. Comments that may be useful or requested by the source location, such as keywords that facilitate searching, may be include between <description> tags 508.

The present invention also allows for the attachment of one or more files to the software envelope by describing the attachments between a pair of <attachment> tags 510 for each attached file. The name of an attached file may be included between <filename> tags 512 and a textual description of the attached file may be contained within <description> tags 514. The type of file may be included between <type> tags 516. There are many situations in which a user may want to attach a file to the software envelope. For example, a user may want to attach prices found in an advertisement distributed by a supplier to an envelope containing a part order request. The user can scan the advertisement and create an image in JPG format. FIG. 5 shows what the manifest format may look like when a user attaches a JPG image of an advertisement to a part order request. When more than one file is attached to a software envelope, each attachment may be identified by a unique index number placed between <index> tags (not shown).

Data file 206 (shown in FIG. 2) may be contained between <body> tags. Data file 206 is preferably marked up with a markup language that matches the markup used for software envelope 204. The format of the marked up file will be in accordance with a schema agreed upon by the source and destination locations. FIG. 6 shows an example of a marked up data file. Opening schema tag 602 identifies the schema as "part_order_3." A namespace reference 603 may be included to distinguish namespace 603 associated with the schema from namespace 303 associated with opening element type tag 302. A variety of information and corresponding tags make up the document 604, which corresponds to data 206 shown in FIG. 2. As an example, FIG. 6 shows a document 604 used for ordering parts. The identification of the schema allows application 212 or adapter 210 to use an appropriate plugin to parse and extract the data from the data file. A plugin may implement the design pattern by which object constructors are linked with Document Object Model (DOM) nodes that are contained within the software envelope. For example, a plugin constructed in accordance with schema part_order_3 would know that the part number corresponding to the part being ordered would be found between the <partNo> tags. Furthermore, a schema may indicate that certain information is optional. For example, the description information found between the <description> tags shown in FIG. 6 may be optional. The corresponding plugin may extract optional information if it is present.

The appropriate plugin may depend upon the operating system utilized by the destination location. For example, a first plugin may extract the information contained in the data file shown in FIG. 6 and rehydrate the information into an object recognized by the first operating system. Furthermore, a second plugin may be used to extract and rehydrate the same information into an object recognized by a second operating system. In one embodiment of the invention, a plugin or parser may be attached to the software envelope. In another embodiment, the plugin may be contained within the software envelope.

While the present invention has been described in connection with the illustrated embodiments, it will be appreciated and understood that modifications may be made without departing from the true spirit and scope of the invention.

What is claimed is:

1. A method for exchanging data between a source location and a destination location comprising the steps of:

generating a data file formatted in a markup language in accordance with a predetermined schema;

generating a first software envelope containing the data file;

selecting a plugin from a plurality of plugins based on the predetermined schema, said plugin configured to create an object from the markup language of the data file;

attaching the plugin to the software envelope;

transmitting the software envelope to the destination location; and using the plugin to create the object from the markup language of the data file, wherein the step of using the plugin to create the object from the markup language of the data file comprises using the plugin to:

parse the data file into a plurality of data fields according to the predetermined schema, determine a first data field in the plurality as an optional data field based on the predetermined schema, and determine a second data field in the plurality as a required data field based on the predetermined schema.

2. The method of claim 1, wherein the markup language comprises extensible markup language (XML).

3. The method of claim 1, wherein the markup language comprises standard generalized markup language (SGML).

4. The method of claim 1, wherein the step of transmitting comprises transmitting the software envelope via electronic mail.

5. The method of claim 1, wherein the step of transmitting comprises transmitting the software envelope via HTTP.

6. The method of claim 1, wherein the software envelope contains the plugin.

7. A method for exchanging data between a source location and a destination location comprising the steps of:
- generating a data file formatted in a markup language in accordance with a predetermined schema;
- generating a first software envelope formatted in a markup language and containing the data file, the first software envelope including fields for forward and return routing information;
- selecting a plugin based on the predetermined schema, said plugin configured to create an object from the markup language of the data file;
- determining an operating system associated with the destination location before selecting the plugin, wherein the plugin is selected based on said operating system;
- attaching the plugin to the first software envelope; and
- transmitting the first software envelope to the destination location,
- wherein the format of the first software envelope is used by an application in the destination location to automatically generate a reply software envelope for routing information to the source location by swapping the forward and return routing information in the respective fields of the first software envelope, and
- wherein the plugin includes executable code to provide to the application the functionality of creating the object from the markup language of the data file.

8. The method of claim 7, wherein the markup language comprises extensible markup language (XML).

9. The method of claim 7, wherein the markup language comprises standard generalized markup language (SGML).

10. The method of claim 7, wherein the step of transmitting comprises transmitting the first software envelope via electronic mail.

11. The method of claim 7, wherein the step of transmitting comprises transmitting the first software envelope via HTTP.

12. The method of claim 7, wherein the first software envelope contains the plugin.

13. One or more computer readable media storing computer-executable instructions which, when executed on a computer system, cause the computer to perform a method comprising steps of:
- generating a data file formatted in a markup language in accordance with a predetermined schema;
- generating a first software envelope containing the data file;
- selecting a plugin from a plurality of plugins based on the predetermined schema, said plugin configured to create an object from the markup language of the data file;
- attaching the plugin to the software envelope;
- transmitting the software envelope to the destination location; and
- using the plugin to create the object from the markup language of the data file,
- wherein the step of using the plugin to create the object from the markup language of the data file comprises using the plugin to:
  - parse the data file into a plurality of data fields according to the predetermined schema,
  - determine a first data field in the plurality as an optional data field based on the predetermined schema, and
  - determine a second data field in the plurality as a required data field based on the predetermined schema.

14. The computer readable media according to claim 13, wherein the markup language comprises extensible markup language (XML).

15. The computer readable media according to claim 13, wherein the markup language comprises standard generalized markup language (SGML).

16. The computer readable media according to claim 13, wherein the software envelope contains the plugin.

17. One or more computer readable media storing computer-executable instructions which, when executed on a computer system, cause the computer system to perform a method comprising steps of:
- generating a data file formatted in a markup language in accordance with a predetermined schema;
- generating a first software envelope containing the data file, the first software envelope including fields for forward and return routing information, the forward routing information designating a destination location;
- selecting a plugin which is stored at the destination location based on the predetermined schema, said plugin configured to create an object from the markup language of the data file;
- determining an operating system associated with the destination location before selecting the plugin, wherein the plugin is selected based on said operating system;
- providing an identifier of the selected plugin in the first software envelope; and
- transmitting the first software envelope to the destination location,
- wherein the format of the first software envelope is used by an application in the destination location to automatically generate a reply software envelope for routing information to the source location by swapping the forward and return routing information in the respective fields of the first software envelope, and
- wherein the plugin identifier identifies the selected plugin stored in the destination location to be plugged into the application to provide the functionality of creating the object from the markup language of the data file.

18. The computer readable media according to claim 17, wherein the markup language comprises extensible markup language (XML).

19. The computer readable media according to claim 17, wherein the markup language comprises standard generalized markup language (SGML).

20. The computer readable media according to claim 17, wherein the software envelope contains the plugin.

* * * * *